US005489459A

United States Patent [19]

Nauman

[11] Patent Number: 5,489,459

[45] Date of Patent: Feb. 6, 1996

[54] PROTECTIVE PAINT IMPERMEABLE FLOOR COVER

[76] Inventor: Jonathon L. Nauman, 1431 E. Del Rio Dr., Tempe, Ariz. 85252

[21] Appl. No.: 204,631

[22] Filed: Mar. 2, 1994

[51] Int. Cl.$^{6}$ ........................ B32B 3/02; B32B 3/10

[52] U.S. Cl. ........................ 428/43; 428/906; 118/504; 206/820

[58] Field of Search ........................ 428/43, 80, 906, 428/83, 81; 206/820; 118/504, 505

[56] References Cited

U.S. PATENT DOCUMENTS

| | | | |
|---|---|---|---|
| 1,889,261 | 11/1932 | Otten | 428/81 |
| 3,143,208 | 8/1964 | Sizemore | 206/820 |
| 4,398,495 | 8/1983 | Harris et al. | 118/504 |
| 5,164,238 | 11/1992 | Horiki et al. | 118/505 |

*Primary Examiner*—Alexander S. Thomas
*Attorney, Agent, or Firm*—Tod R. Nissle

[57] ABSTRACT

An elongate, pliable, paint impermeable cover protects the floor around a doorway during painting. The cover can be folded over itself to size the cover for a smaller doorway.

4 Claims, 2 Drawing Sheets

PROTECTIVE PAINT IMPERMEABLE FLOOR COVER

This invention relates to apparatus for use while painting a building structure.

More particularly, the invention relates to an elongate, pliable paint impermeable cover for protecting the floor around a doorway during painting.

Drop cloths are well known in the art and are used to protect flooring when the walls or ceiling of a building are being painted. Such drop cloths are usually comprised of rectangular pieces of plastic or other pliable, paint impermeable materials. The use of such prior art drop cloths around corners and doorways is awkward because there is an overly large volume of material in the drop cloth in comparison to the small space to be protected in the doorway and because wrapping the cloth around corners causes the material to bunch up which produces an uneven surface on which to place paint and other equipment and which poses a safety hazard because painters or inhabitants of the building structure being painted can trip over the bunched up drop cloth. Around doorways masking tape can be used in place of a drop cloth. The use of tape is, however, time consuming, and when masking tape is used on carpet it can pull the pile out of the carpet.

Accordingly, it would be highly desirable to provide apparatus which would facilitate painting around a doorway, which would conform to the floor and have a flat profile, and which could be quickly installed and removed.

Therefore, it is a principal object of the invention to provide an improved apparatus for protecting flooring around a doorway during painting of the doorway and walls and ceiling adjacent the doorway.

A further object of the invention is to provide improved painting apparatus of the type described which can be readily installed around a doorway while maintaining a low, flat profile parallel to the floor.

Another object of the invention is to provide improved painting apparatus of the type described which can stored on and dispensed from a roll.

BRIEF DESCRIPTION OF THE DRAWINGS

These and other, further and more specific objects and advantages of the invention will be apparent to those skilled in the art from the following detailed description thereof, taken in conjunction with the drawings in which.

Figure 2:
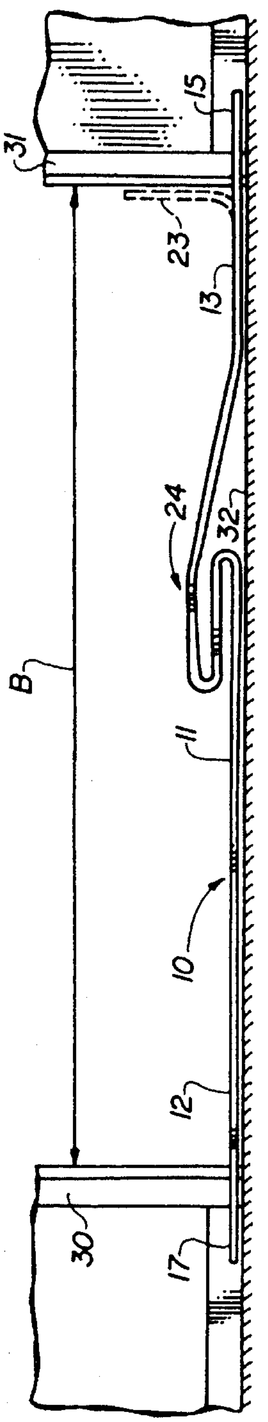
FIG. 2 is a side view of the sheet apparatus of FIG. 1 illustrating the mode of operation thereof.

Briefly, in accordance with my invention, I provide an elongate, pliable cover for protecting the floor around a doorway during painting. The doorway includes a pair of opposed parallel door jambs which bound and define the doorway and extend upwardly from the floor. The cover includes a central portion and first and second ends each including a pair of ears attached to and extending outwardly from said central portion and bracketing and defining a U-shaped space intermediate said pair of ears and opening outwardly away from the central portion. The cover and the U-shaped spaces are shaped and dimensioned such that the cover can be laid flat on the floor intermediate said door jambs with said jambs each received in one of said U-shaped spaces and each of the ears extending over said floor laterally of one of the door jambs. The central portion and the ears are fabricated from material which is resistant to the permeation of paint through the material.

In accordance with another embodiment of my invention, I provide an elongate, pliable cover for protecting the floor around first and second doorways during painting. The doorways each include a pair of opposed parallel door jambs which border and define the doorway and extend upwardly from the floor. The first doorway is wider than the second doorway. The cover includes a central portion and first and second ends each including a pair of ears attached to and extending outwardly from said central portion and bracketing and defining a U-shaped space intermediate said pair of ears and opening outwardly away from the central portion. The cover and the spaces are shaped and dimensioned such that the cover can be laid flat on the floor intermediate said door jambs of the first doorway with said jambs each received in one of said spaces and each of the ears extending over said floor laterally of one of the door jambs. When the cover is folded over onto itself a selected amount to reduce the distance between said ends, said cover can be laid on the floor intermediate and extending between said door jambs in the second doorway with the jambs in the second doorway each received in one of the U-shaped spaces and each of the ears extending over the floor laterally of one of the door jambs in the second doorway. The central portion and the ears are fabricated from material which is resistant to the permeation of paint through the material.

In still another embodiment of my invention, I provide a roll of sheet material resistant to permeation of paint through the material. The roll of material has lines of weakening along which the material is separable to produce a plurality of pliable covers for protecting the floor area around a doorway during painting. The doorway includes a pair of opposed parallel door jambs which border and define the doorway and extend upwardly from the floor. The covers each include a central portion and first and second ends each including a pair of ears attached to and extending outwardly from said central portion and bracketing and defining a U-shaped space intermediate said pair of ears opening outwardly away from the central portion. The spaces on each cover are shaped and dimensioned such that the cover can be laid flat on the floor intermediate said door jambs with said jambs each received in one of said spaces and each of the ears extending over said floor laterally of one of the door jambs. The central portion and the ears are fabricated from material which is resistant to the permeation of paint through the material.

Figure 1:
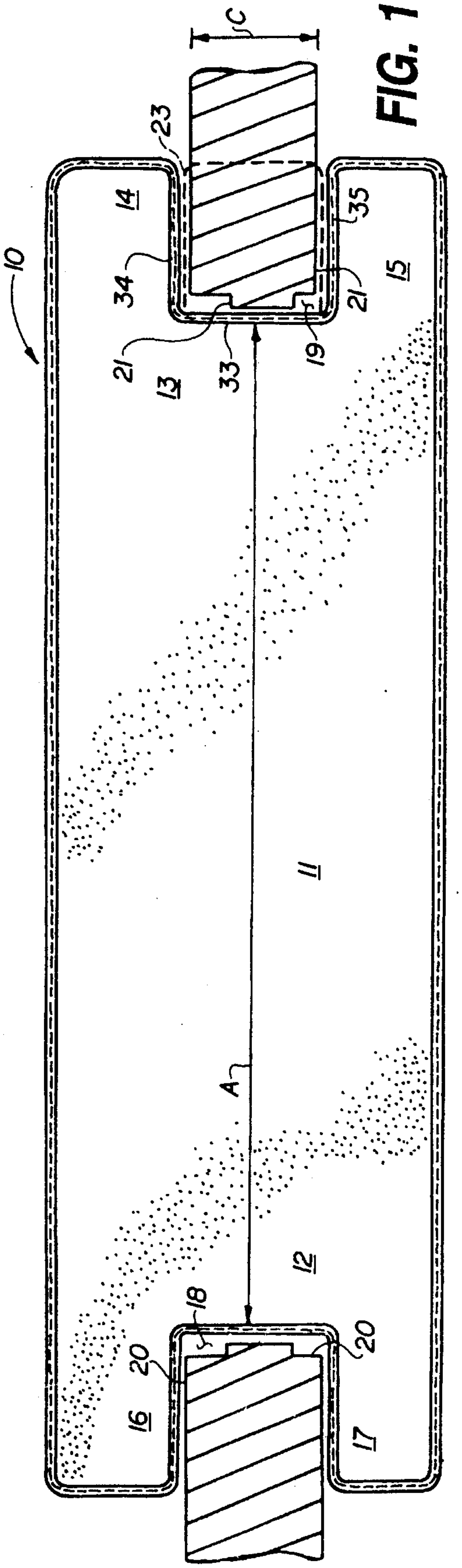
FIG. 1 is a top view of sheet apparatus constructed in accordance with the principles of the invention.

Turning now to the drawings, which define the presently preferred embodiments of the invention for the purpose of illustrating the practice thereof and not by way of limitation of the scope of the invention, and in which like reference characters identify corresponding elements throughout the several views, FIGS. 1 and 2 illustrate an elongate cover constructed in accordance with the principles of the invention and generally indicated by reference character 10. Cover 10 is fabricated from cardboard, metal, or any other material or combination of pliable or non-pliable materials which is resistant to penetration by paint. However, cover 10 is preferably a pliable sheet material which is resistant to the permeation of paint through the material. The cover 10 includes a central portion 11 and first and second ends 12 and 13. A pair of ears 14 and 15 are attached to the second end 13. Ears 16 and 17 are attached to first end 12. Ears 16 and 17 bound and define U-shaped space 18 intermediate ears 16 and 17. Space 18 opens outwardly away from central portion 11 and end 12 and is shaped and dimensioned to receive the lower portion of one 20 of the parallel, spaced apart pair 20, 21 of upstanding door jambs bounding a doorway. Ears 14 and 15 bound and define U-shaped space 19 intermediate ears 14 and 15. Space 19 opens outwardly away from central portion 11 and end 12 and is shaped and dimensioned to receive the lower portion of the other 21 of the door jambs 20, 21 bounding a doorway. The width of the doorway, i.e., the distance between jambs 20 and 21, is indicated by arrows A.

The cover 10 can, if desired, include at each end an additional flap, indicated by dashed lines 23 in FIG. 1, which is attached to an end 13 of cover 10 and occupies one 19 of the U-shaped spaces 18, 19.

In use, the pliable cover 10 is laid flat on the floor in the manner shown in FIG. 1 and extends between the jambs 20 and 21 of a doorway. Cover 10 is sized such that the length of cover 10 between U-shaped spaces 18 and 19 is about equal to the distance, indicated by arrows A, between the opposing door jambs 20, 21 in a doorway. Since there are several standard doorway widths and door jamb widths, cover 10 is preferably fabricated in several standard sizes. Each standard size of cover 10 is adapted for standard doorway of selected size and has a selected distance, indicated by arrows A, between U-shaped spaces 18 and 19 which is equal to or slightly less than the distance between the door jambs of the selected standard size doorway. Each standard size of cover also has U-shaped spaces 18 and 19 having a width, indicated by arrows C, which is equal to or slightly less than the width of the door jambs 20 and 21. In FIG. 1, the width of door jambs 20 and 21 is also indicated by arrows C. Ears 14 to 17 each extend over the floor along side of, i.e. laterally of, one of the door jambs 20 and 21 in FIG. 1. When the door jambs 20 and 21, the wall adjacent the door jambs, and the ceiling directly above the door jambs are painted, cover 10 protects the floor area which is between and adjacent jambs 20 and 21. Cover 10 is desirable because it is quickly installed and, since cover 10 lays flat on the floor and closely conforms to jambs 20 and 21, because in use cover 10 represents only a minimal safety hazard.

FIG. 2 illustrates the installation of cover 10 in a doorway having a width, indicated by arrows B, which is less than the width, indicated by arrows A, of the doorway in FIG. 1. In FIG. 2, the central portion 11 of cover 10 is folded over onto itself in the zig-zag fashion indicated by reference character 24 in order to shorten the distance between the U-shaped spaces 18 and 19 to be about equal to the distance, indicated by arrows B, between door jambs 30 and 31. The width of the door jambs 30 and 31 in FIG. 2 is equal to or less than the width, indicated by arrows C, of the door jambs 20 and 21 in FIG. 1. This will normally be the case because when a first doorway is compared with a second doorway which has a smaller width than the first doorway, the door jambs in the second doorway ordinarily have a width which is equal to or smaller than the width of the jambs in the first doorway. In FIG. 2, cover 10 is also laid flat on the floor 32, except for the folded portion 24 which does not directly contact the floor 32.

If a U-shaped space 18, 19 is provided with a tongue 23, the tongue 23 can be folded under end 13 when cover 10 is installed or can, as shown by dashed lines 23 in FIG. 2, be folded upwardly to bear against a door jamb 31. Tongue 23 can be attached to or integrally formed with cover 10 along the bottom 33 of a U-shaped space 19 or along one side 34, 35 of a U-shaped space 19.

Figure 3:
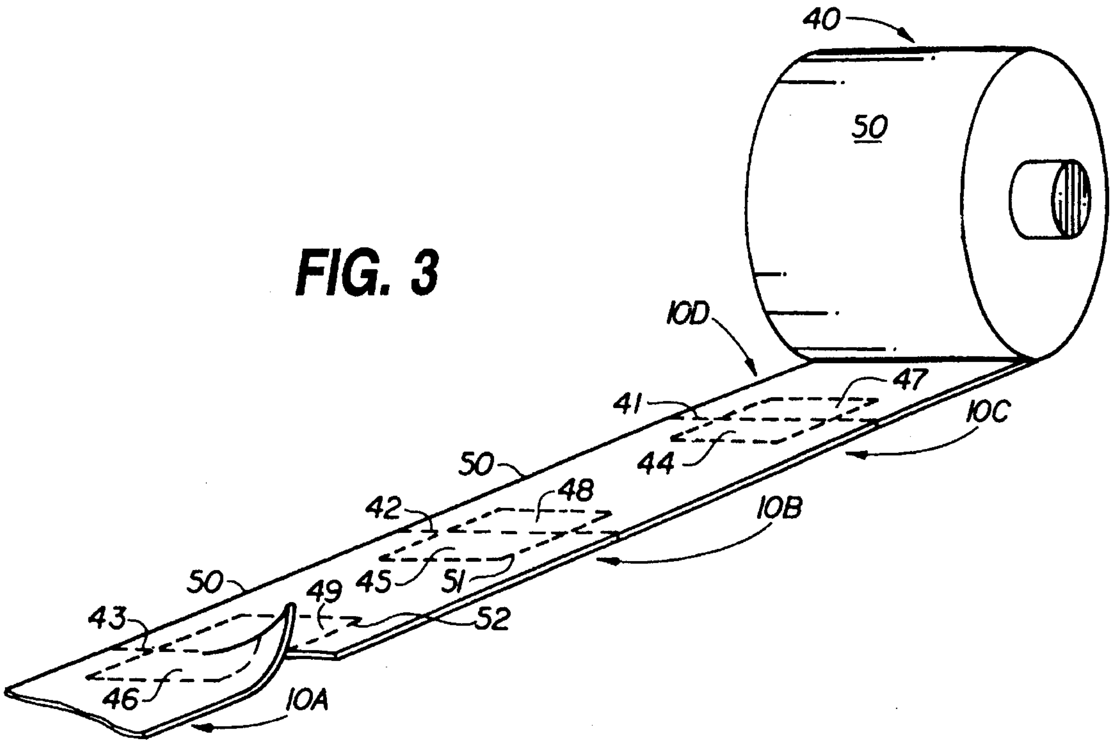
FIG. 3 is a perspective view illustrating sheet apparatus of the invention stored on a roll; and, FIG. 4 is a top view of sheet apparatus detached from the storage roll of FIG. 3.

FIG. 3 illustrated a roll 40 of a strip 50 of material which is resistant to permeation of paint through the material. In FIG. 3, all of the dashed lines on strip 50, including dashed lines 41 to 43, are lines of weakening, for example lines of perforation, which permit strip 50 to be readily torn or separated along the lines of weakening in the manner that cover 10A is being separated along line of weakening 43 from cover 10B. In FIG. 3, each cover 10A to 10D in strip 50 is, but need not be, of equal shape and dimension. In FIG. 3, the covers 10A to 10D in strip 50 are, but need not be, attached end-to-end.

If desired, in FIG. 3 strip 50 can be fabricated with panels 44, 45, 46, 47, 48, and 49 removed before strip is wound to form roll 40. In this case, covers 10A to 10D would still be attached end-to-end, but would only, for example, be attached along perforated lines intermediate the ears 14A, 15A of one cover 10A and the adjacent ears 17A, 16A of the next cover 10B.

Figure 4:
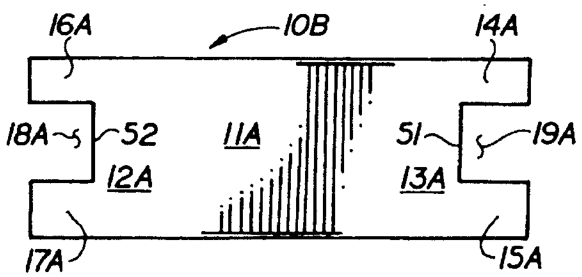

FIG. 4 illustrates cover 10B after it has been removed from strip 50 by separating cover 10A from cover 10B by tearing along line of weakening 43, by separating cover 10B from cover 10C by tearing along line of weakening 41, and by removing panels 45 and 49 by tearing along U-shaped lines of weakening 51 and 52. Removing panels 45 and 49 along lines 51 and 52 forms U-shaped spaces 18A and 19A. Cover 10B includes central portion 11A, ends 12A and 13A, ears 14A and 15A attached to end 13A, and ears 16A and 17A attached to end 12A.

Having described my invention in such terms as to enable those skilled in the art to make and use the invention and having described the presently preferred embodiments thereof, I claim:

1. A cover for protecting the floor area around a doorway during painting, said doorway having a selected width and including a pair of opposed parallel door jambs bordering and defining said doorway and extending upwardly from said floor, said cover including (a) a central portion, (b) first and second ends each including (i) a pair of ears attached to and extending outwardly from said central portion and bracketing and defining a U-shaped space intermediate said pair of ears, said space opening outwardly away from said central portion, and (ii) a tongue attached to said central portion, normally extending into said U-shaped space, and deformable to a position outside of said U-shaped space;

said cover, said tongue, said ears, and said spaces at said first and second ends being shaped and dimensioned such that said central portion of said cover can be laid flat on the floor intermediate and extending between said door jambs with (i) said jambs each received in one of said U-shaped spaces, (ii) each of said ears extending over and laying on said floor laterally of one of said door jambs, and (iii) each of said tongues extending upwardly from the floor, from said central portion, and from said ears, and laying against one of said door jambs, said central portion and said ears being fabricated from a material resistant to the permeation of paint through the material.

2. A pliable cover for protecting the floor area around first and second doorways during painting, each of said doorways including a pair of opposed parallel door jambs bordering and defining said doorway and extending upwardly from said floor, said first doorway being wider than said second doorway, said cover including (a) a pliable central portion;

(b) pliable first and second ends each including a pair of ears attached to and extending outwardly from said central portion and bracketing and defining a U-shaped space intermediate said pair of ears;

(c) a longitudinal axis extending from said first end to said second end;

said cover and said spaces at said first and second ends being shaped and dimensioned such that said cover can be laid flat on the floor intermediate and extending between said door jambs in said first doorway with said jambs each received in one of said spaces and each of said ears extending over said floor laterally of one of said door jambs in said first doorway, and, said pliable central portion can be folded over onto itself in an S-shaped fold with fold lines normal to said longitudinal axis to reduce the distance between said ends such that said cover can be laid flat on the floor intermediate and extending between said door jambs in said second doorway with said jambs in said second doorway each received in one of said spaces and each of said ears extending over and contacting said floor laterally of one of said door jambs in said second doorway, said central portion and said ears being fabricated from a material resistance to permeation of paint through the material;

each of said ends including a tongue attached to said central portion, normally extending into said U-shaped space, and deformable to a position outside of said U-shaped spaces.

3. A roll of pliable sheet material resistant to permeation of paint through the material, the roll of material having a plurality of spaced apart, equivalent sets of lines of weakening formed in the roll of material, each sequential pair of said sets of lines of weakening being an equal distance apart, the material being separable along any sequential pair of said equivalent sets of lines of weakening to produce a pliable imperforate cover for protecting the floor area around a doorway during painting, said doorway having a selected width and including a pair of opposed parallel door jambs bordering and defining said doorway and extending upwardly from said floor, said imperforate cover including (a) an imperforate central portion, (b) first and second imperforate ends each including a pair of ears integrally formed with, attached to and extending outwardly from said central portion and bracketing and defining a U-shaped space intermediate said pair of ears;

said cover and said U-shaped spaces at said first and second ends being shaped and dimensioned such that said imperforate cover can be laid flat on the floor intermediate said door jambs in said first doorway with said jambs each received in one of the U-shaped spaces and each of said ears extending over said floor laterally of one of said door jambs in said first doorway.

4. The elongate roll of sheet material of claim 3, wherein said covers are attached end-to-end along said lines of weakening in the sheet material.

* * * * *